United States Patent [19]

Arima et al.

[11] 4,383,148
[45] May 10, 1983

[54] STEERING WHEEL SWITCH AND ELECTRICAL INTERCONNECTION ASSEMBLY

[75] Inventors: Sumitsugu Arima, Yokosuka; Hiroshi Tsuda, Yokohama, both of Japan

[73] Assignee: Nissan Motor Company, Limited, Yokohama, Japan

[21] Appl. No.: 223,808

[22] Filed: Jan. 9, 1981

[30] Foreign Application Priority Data

Jan. 11, 1980 [JP] Japan .............................. 55-2313[U]
Mar. 17, 1980 [JP] Japan ............................ 55-34695[U]

[51] Int. Cl.³ ...................... H01H 9/00; H01R 39/00
[52] U.S. Cl. ............................... 200/61.54; 200/61.55; 339/35
[58] Field of Search ............... 200/61.27, 61.54–61.57; 339/3 R, 3 S

[56] References Cited

U.S. PATENT DOCUMENTS 1,922,493  8/1933  Murray ........................... 200/61.55
2,106,925  2/1938  Hagler ......................... 200/61.55 X
2,221,409  11/1940 Phelps et al. .................... 200/61.55
4,218,073  8/1980  Cymbal ........................... 339/3 S X

*Primary Examiner*—J. R. Scott
*Attorney, Agent, or Firm*—Lane, Aitken & Kananen

[57] ABSTRACT

A steering mechanism for a steerable vehicle such as an automotive vehicle, including a steering column tube fixed to the body structure of the vehicle, a steering shaft extending through and rotatable with respect to the column tube, and a steering wheel structure rotatable with the steering shaft, wherein a switch support structure supporting a switch assembly including, for example, a switch for a warning horn is arranged to be rotatable with respect to each of the steering column tube, steering shaft and steering wheel structure and is connected to the steering column tube by means of two flexible lines which are wound in such a manner that the switch support structure is held stationary with respect to the steering column tube irrespective of the turning of the steering wheel structure and the steering shaft.

16 Claims, 14 Drawing Figures

STEERING WHEEL SWITCH AND ELECTRICAL INTERCONNECTION ASSEMBLY

FIELD OF THE INVENTION

The present invention relates to a steering mechanism for a steerable vehicle such as a wheeled land vehicle and, more particularly, to a vehicle steering mechanism arranged with a switch support structure supporting a warning horn switch or, in general, manually operated electric switches positioned inside the rim portion of the steering wheel of the mechanism.

BACKGROUND OF THE INVENTION

One of the recent trends in designing automotive vehicles is to equip an automotive vehicle with various extra instruments and accessories which have thus far been offered for users' option. Typical examples of these instruments and accessories are audio players and drive computers (which are the instruments to display the fuel consumption rates and the scheduled times of arrival at the destinations of travel). Such instruments and accessories are sometimes required to have been incorporated in completed automotive vehicles before the vehicles are delivered "ex factory."

Provision of the additional instruments and accessories has enhanced the centralization of the fitting and wiring arrangements on the instrument panel of an automotive vehicle. Situations presently encountered as a consequence are such that there are practically no spaces available underneath the instrument panel, making more strict the design considerations for the layout of the additional instruments and accessories.

Attempts have therefore been made to install some extra instruments and accessories on a support structure provided inside the rim portion of the steering wheel structure so as to ease the space requirement for the setup of the instruments and accessories.

A known steering mechanism to realize such a scheme comprises a steering main shaft connected to the steering gear mechanism and a steering countershaft arranged in parallel with the main shaft and supporting the steering wheel structure. The main and countershaft are engaged with each other by means of gears respectively mounted or formed on the shafts so that a turning load applied to the steering wheel structure is transmitted to the steering main shaft through the countershaft and the gears which are in mesh with each other. The support structure having mounted thereon an accessory implement such as the switch unit of a warning horn system is supported by a member secured to a steering column tube fixed with respect to the body structure of the vehicle. The countershaft carrying the steering wheel structure is rotatably mounted on such a member and is permitted to turn with the steering wheel structure independently of the switch support structure. Thus, the switch support structure is maintained at a standstill irrespective of the turning motions of the steering wheel structure.

Drawbacks are, however, concomitant with a prior-art steering mechanism of this nature principally due to the intricate construction of the mechanism using the two parallel shafts and the gears respectively mounted or formed on the shafts.

The present invention contemplates provision of a steering mechanism which is free from such drawbacks but which is nevertheless capable of achieving the advantage of the known steering mechanism of the described general nature.

SUMMARY OF THE INVENTION

In accordance with the present invention, there is provided a steering mechanism for a steerable vehicle including a body structure having a fore-and-aft direction, comprising a hollow steering column tube which is held stationary with respect to the vehicle body structure, a steering shaft axially extending in and through the steering column tube and having a rear end portion projecting rearwardly from the column tube, the steering shaft having a center axis therethrough and being rotatable about the center axis with respect to the steering column tube, a steering wheel structure rotatable with the steering shaft about the center axis of the steering shaft and including a hub portion secured to the rear end portion of the steering shaft, a switch support structure having an electric switch assembly supported thereon, the switch support structure being rotatable about an extension of the center axis of the steering shaft with respect to each of the steering column tube, the steering shaft and the steering wheel structure, first spool means fixed with respect to the switch support structure and having two outer peripheral surface portions which are substantially distinct from each other along the extension of the center axis of the steering shaft, second spool means fixed on the steering column tube and having two outer peripheral surface portions which are distinct from each other along a portion of the center axis of the steering shaft, and at least two flexible lines each anchored at one end thereof to the first spool means and at the other end thereof to the second spool means, one of the flexible lines being wound in one direction on one of the outer peripheral surface portions of the first spool means and on one of the two outer peripheral surface portions of the second spool means, the other of the flexible lines being would in the other direction on the other of the two outer peripheral surface portions of the first spool means and on the other of the two outer peripheral surface portions of the second spool means.

BRIEF DESCRIPTION OF THE DRAWINGS

The drawbacks of a prior-art steering mechanism of the nature previously described briefly and the features and advantages of a steering mechanism according to the present invention will be more clearly understood from the following description taken in conjunction with the accompanying drawings in which.

FURTHER DESCRIPTION OF THE PRIOR ART

Figure 1:
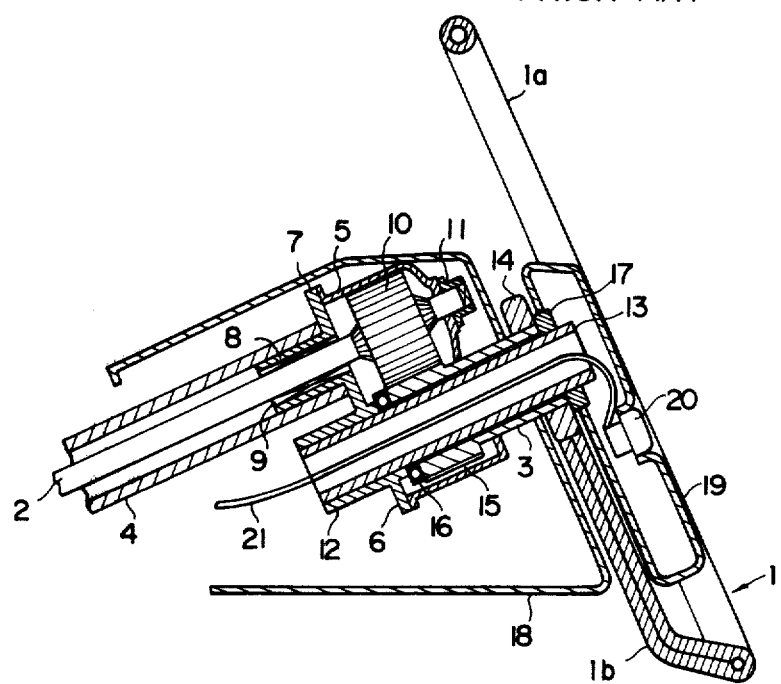
FIG. 1 is a longitudinal sectional view showing a representative example of a steering mechanism of the nature to which the present invention appertains.

Referring to FIG. 1 of the drawings, a prior-art steering mechanism is illustrated as comprising a steering wheel 1, a steering main shaft 2 and a hollow steering countershaft 3. The steering main shaft 2 axially extends through a hollow steering column tube 4. The steering wheel 1 has a circular rim portion 1a and at least one radial spoke portion 1b radially extending inwardly from the rim portion 1a.

The steering mechanism herein shown is used in an automotive vehicle and, thus, the steering column tube 4 is connected at its front end to the body structure (not shown) of the automotive vehicle. On the other hand, the steering main shaft 2 is connected at its front end to a steering gear mechanism which is linked through a suitable steering linkage to front road wheels of the vehicle, though not shown.

The steering main shaft 2 axially projects outwardly from the steering column tube 4 into a gear casing 5 which is securely attached to the steering column tube 4 by means of a mounting flange member 6. The mounting flange member 6 has an annular flange portion 7 which is fitted to the rear end face of the steering column tube 4 and which has the gear casing 5 fixedly connected thereto. The mounting flange member 6 further has a tubular sleeve portion 8 which projects perpendicularly from the annular flange portion 7 and which is closely fitted into the rear end portion of the axial bore in the steering column tube 4. A bearing 9 is provided between the tubular sleeve portion 8 and the steering main shaft 2, which is thus freely rotatable on the inner peripheral surface of the sleeve portion 8 and accordingly with respect to the steering column tube 4.

The steering main shaft 2 has a spur gear 10 securely mounted on its axial portion projecting into the gear casing 5. The steering main shaft 2 further has a rear pilot end portion axially projecting rearwardly from the spur gear 10. The pilot end portion of the steering main shaft 2 is journaled in a pilot bearing 11 which is retained in the gear casing 5.

The mounting flange member 6 further has a cylindrical sleeve portion 12 which is parallel with the above mentioned tubular sleeve portion 8. The tubular sleeve portion 12 of the flange member 6 is axially aligned with the hollow steering countershaft 3 and has securely received therein a front end portion of the hollow cylindrical post member 13. The cylindrical post member 13 axially projects rearwardly from the tubular sleeve portion 12 of the flange member 6 and has the steering countershaft 3 rotatably received thereon. The steering wheel 1 is supported by the steering countershaft 3 by means of a central boss member 14 which is securely connected between the radial spoke portion 1b of the steering wheel 1 and a rear end portion of the steering countershaft 3. The steering countershaft 3 has a spur gear portion 15 which is in mesh with the spur gear 10 on the steering main shaft 2. The above mentioned gear casing 5 has a wall portion having the gear portion 15 of the steering countershaft 3 accommodated therein.

The steering countershaft 3 is axially held in position on the cylindrical post member 13 by means of a thrust bearing 16 provided between the steering countershaft 3 and the tubular sleeve portion 12 of the flange member 6 and an annular retaining member 17 secured to a rear end portion of the cylindrical post member 13 which axially projects rearwardly from the steering countershaft 3 as shown. The steering column tube 4 and the gear casing 5 are enclosed within a steering column cover 18, as shown.

The steering countershaft 3 and the post member 13 rearwardly project outwardly from the gear casing 5 and further from the steering column cover 18 through openings formed in respective rear end wall portions of the casing 5 and the column cover 18. The central boss member 14 and the annular retaining member 17 are positioned outside the rear end wall portion of the steering column cover 18. The retaining member 17 thus positioned has supported thereon a switch support structure such as for example a horn pad 19 which is positioned internally of the rim portion 1a of the steering wheel 1. The horn pad 19 has mounted thereon a horn switch 20 to be manually operated. An electric wire harness 21 leads from the horn switch 20 and is passed through the bore in the cylindrical post member 13 and further through the internal space in the steering column cover 18 for connection to an electric actuator circuit (not shown) of the horn system.

During operation of the steering system, a driver's turning effort applied to the steering wheel 1 is transmitted first to the steering countershaft 3 and from the countershaft 3 to the steering main shaft 2 through the engagement between the spur gear portion 15 of the counter shaft 3 and the spur gear 10 on the main shaft 2. The turning motion of the steering main shaft 2, thus caused to turn in either direction about the axis thereof, is carried to the gear mechanism of the steering system and drives the steering linkage to steer the front road wheels of the vehicle.

In the steering mechanism thus constructed and operative, the cylindrical post member 13 having the steering counter shaft 3 rotatably supported thereon is securely connected to the steering column tube 4 by means of the unitary flange member 6. The steering column tube 4 in turn is securely connected to the body structure of the vehicle as previously noted. Thus, the switch support structure such as the horn pad 19 mounted on the post member 13 through the annular retaining member 17 is held stationary with respect to the body structure of the vehicle during turning motion of the steering wheel 1. The construction of the prior-art steering mechanism shown in FIG. 1 is, for this reason, advantageous for providing an ample space for installation of various switch and other accessory implements inside the rim portion 1a of the steering wheel 1. Provision of such an ample space available for the positioning of the switch and other accessory implements will alleviate the limitations to be taken into consideration in working out a layout for the setups of the accessory implements in conjunction with the steering wheel 1.

Such an advantage is, however, sacrifed by the intricate construction of the steering mechanism which involves the juxtaposition of the steering main and countershaft 2 and 3 and the coupling arrangement between these shafts by the use of the gear 10 on the main shaft 2 and the gear portion 15 of the countershaft 3. Furthermore, the various rotatable members of the steering mechanism are liable to cause loose connection and engagement therebetween during use of the mechanism.

The present invention contemplates elimination of these problems encountered in a conventional steering mechanism whose typical example has been described with reference to FIG. 1.

DESCRIPTION OF THE EMBODIMENTS

Description will be hereinafter made in regard to the first embodiment of the steering mechanism according to the present invention.

Figure 2:
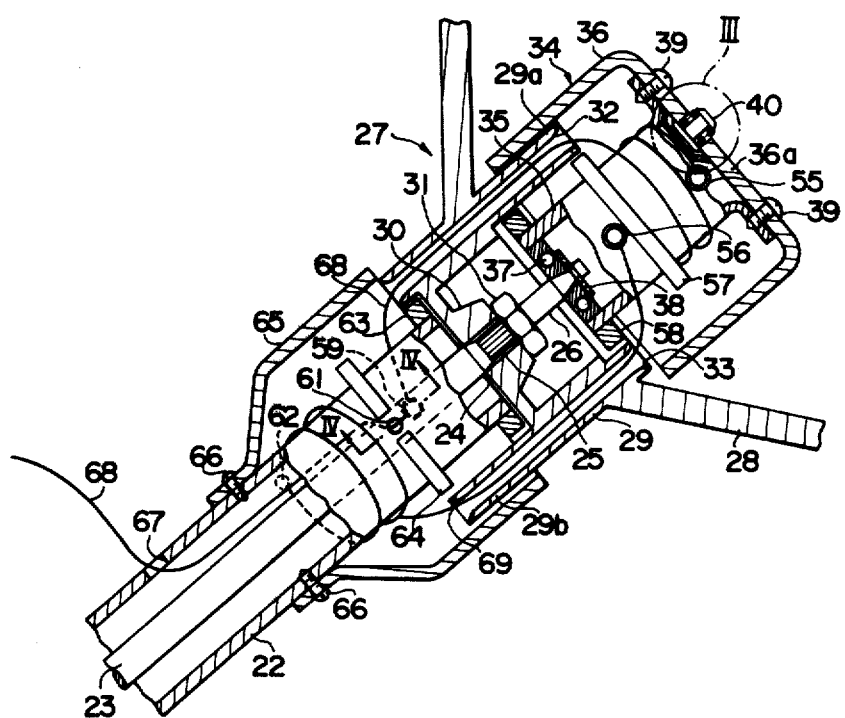
FIG. 2 is a fragmentary longitudinal sectional view showing a first embodiment of the steering mechanism according to the present invention.
Figure 3:
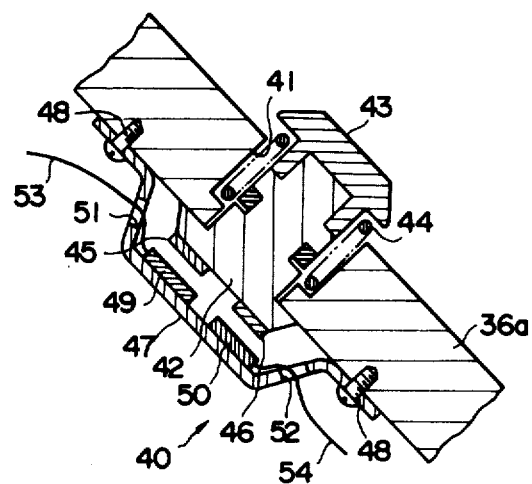
FIG. 3 is a sectional view showing, to an enlarged scale, a portion indicated at "III" in FIG. 2.
Figure 4:
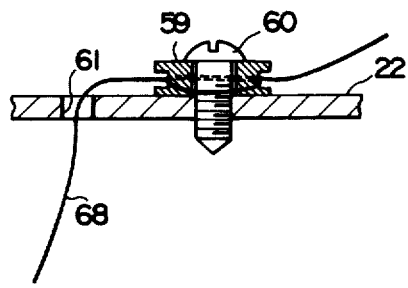
FIG. 4 is a sectional view showing also to an enlarged scale another portion of the embodiment illustrated in FIG. 2.

Referring to FIGS. 2 to 4, first particularly to FIG. 2 thereof, a steering mechanism embodying the present invention comprises an elongated, hollow steering column tube 22 and an elongated steering shaft 23 axially extending in and coaxial with the steering column tube 22. The steering mechanism herein shown is assumed, by way of example, to form part of a steering system of an automotive vehicle and, thus, the steering column tube 22 is securely connected at or adjacent to its front end to the body structure (not shown) of the automotive vehicle. Likewise, the steering shaft 23 is connected at or adjacent to its front end to a suitable gear mechanism (not shown) of the steering system. The gear mechanism in turn is connected through a suitable steering linkage to the front road wheels of the vehicle, though not shown in the drawings. The steering shaft 23 has suitable axial portions journaled in bearings (not shown) supported in the steering column tube 22 and is thus rotatable about the center axis thereof in the steering column tube 22 and accordingly with respect to the body structure of the vehicle.

The steering shaft 23 has a rear axial extension having a rearwardly tapered axial portion 24 axially projecting outwardly from the rear end of the steering column tube 22, and a serrated axial portion 25 extending rearwardly from the tapered axial portion 24. The extension of the steering shaft 23 further has a reduced end portion 26 extending rearwardly from the serrated axial portion 25. The steering shaft 23 is constructed of metal and is therefore electrically conductive.

The steering mechanism shown in FIG. 2 further comprises a steering wheel structure which is shown only partially and which is designated in its entirety by reference numeral 27. The steering wheel structure 27 has a circular rim portion (not shown) and a plurality of radial spoke portions 28 radially extending inwardly from the rim portion in a forwardly tapering, generally frusto-conical configuration, as is customary in the art. The steering wheel structure 27 is further shown comprising a hollow, generally drum-shaped central hub portion 29 which is coaxial with the rim portion. The central hub portion 29 has a cylindrical side wall into which the individual spoke portions 28 of the steering wheel structure 27 radially merge inwardly. The hub portion 29 is formed with a rearwardly open concavity and has a front end wall portion having an inner or rear face defining the front end of the concavity.

The steering wheel structure 27 further has a rearwardly tapering, generally frusto-conical boss portion 30 axially projecting rearwardly from the above mentioned front end wall of the hub portion 29 into the concavity in the hub portion 29. The boss portion 30 is coaxially surrounded by the inner peripheral wall of the hub portion 29 and is formed with an axial bore which is open at both ends thereof. The axial bore in the boss portion 30 is formed conformingly to the tapered and serrated axial portions 24 and 25. The steering wheel structure 27 as a whole is fitted to the steering shaft 23 with the tapered and serrated axial portions 24 and 25 of the shaft 23 passed through the axial bore in the boss portion 30 and with the reduced rear end portion of the shaft 23 projecting rearwardly from the boss portion 30 into the concavity in the hub portion 29 as shown. The rear end portion of the steering shaft 23 thus projecting rearwardly from the boss portion 30 is partially threaded, though not seen in FIG. 2. The steering wheel structure 27 is secured to the steering shaft 23 by means of a clamping nut 31 which is screwed on the threaded portion of the steering shaft 23 to the rear end face of the boss portion 30. The axial bore in the boss portion 30 is aligned with the center axis of the steering shaft 23 so that the steering wheel structure 27 as a whole is held in coaxial relationship to the steering shaft 23 and accordingly to the steering column tube 22.

The central hub portion 29 of the steering wheel structure 27 thus constructed and arranged has formed in its cylindrical side wall first and second axial passageways 32 and 33 each extending in parallel with the center axis of the boss portion 30 and having open front and rear ends. These first and second axial passageways 32 and 33 are formed substantially in diametrically opposite relationship to each other in the hub portion 29 across the center axis of the axial bore in the boss portion 30. In FIG. 2, furthermore, the cylindrical side wall of the hub portion 29 is shown having two axial extensions 29a and 29b each formed with a portion of each of the passageways 32 and 33. The extension 29a is formed with a portion of the first axial passageway 32 and axially projects rearwardly from the side wall of the hub portion 29, while the extension 29b is formed with a portion of the second axial passageway 33 and axially projects forwardly from the side wall of the hub portion 29. The axial extension 29b extends in parallel with a rear axial end portion of the steering shaft 23. Each of the passageways 32 and 33 thus formed in the hub portion 29 and the extensions thereof is defined by a smoothly finished internal surface.

The steering mechanism embodying the present invention further comprises a switch support structure 34 which in part constitutes first spool means in the steering mechanism according to the present invention. In the embodiment shown in FIG. 2, the switch support structure 34 is largely composed of a generally cylindrical, hollow barrel member 35 and a generally cup-shaped finisher or cover member 36 which is open forwardly and which has a rear end wall portion 36a. The barrel member 35 has an open front end and is coaxially and rotatably mounted on the reduced end portion of the rear axial extension of the steering shaft 23 by means of a ball bearing 37. The ball bearing 37 is axially held in position with respect to both of the steering shaft 23 and the barrel member 35 by a suitable bearing retainer element such as an elastic snap ring 38 fitted in a circumferential groove formed in the end portion of the axial extension of the steering shaft 23.

The barrel member 35 has at its rear axial end an annular projection or flange portion securely attached to the inner face of the above mentioned rear end wall portion 36a of the cover member 36 by suitable electrically-conductive fastening means such as metal screws 39 as shown. The cover member 36 has a cylindrical side wall portion axially extending forwardly from the outer circumferential end of the rear end wall portion 36a. The cylindrical side wall portion of the cover member 36 coaxially surrounds the barrel member 35 and, thus, forms an annular open space between the barrel member 35 and the cylindrical side wall portion of the cover member 36. The first axial extension 29a of the hub portion 29 of the steering wheel structure 27 projects rearwardly into this annular open space and accordingly extends in parallel with a front axial portion of the barrel member 35. The first axial passageway 32 in the hub portion 29 is thus rearwardly open in the vicinity of the outer peripheral surface of the barrel member 35.

The switch support structure 34 composed of the barrel and cover members 35 and 36 constructed and arranged as above described is bodily rotatable with respect to the steering shaft 23 and the steering wheel structure 27 about a rearward extension of the center axis of the steering shaft 23. Each of the barrel and cover members 35 and 26 and the component elements of the ball bearing 37 is constructed of metal and is electrically conductive.

The cover member 35 thus forming part of the switch support structure 34 is arranged with a horn switch device which is designated generally by reference numeral 40 in FIG. 2 and which is illustrated in detail in FIG. 3.

As shown in FIG. 3, the rear end wall portion 36a of the cover member 36 is formed with an opening 41 which is open inwardly and outwardly of the cover member 36. The horn switch device 40 is provided in conjunction with this opening 41 and comprises an electrically conductive plunger 42 axially movable through the opening 41 and having an electrically non-conductive push-button element 43 secured to the plunger 42 and projecting axially outwardly from the opening 41. The plunger 42 has at its inner end an annular projection or flange portion axially projecting forwardly into the cover member 36. The flange portion of the plunger 42 is larger in cross section than the opening 41 at the front or axially inner end of the opening so that the plunger 42 is prevented from being moved rearwardly out of the opening 41. The plunger 42 is urged to axially move rearwardly through the opening 41 for having the flange portion pressed against the inner face of the rear end wall portion 36a by suitable biasing means. In FIG. 3, such biasing means is shown comprising a helical compression spring 44 which is seated between an axially outer flange portion of the push-button element 43 and an annular face formed in the opening 41.

The horn switch device 40 shown in FIG. 3 further comprises a pair of electrically conductive contact elements 45 and 46 which are securely attached to the inner end face of the plunger 42. The contact elements 45 and 46 are spaced apart a predetermined distance from each other and are electrically connected together through the conductive plunger 42. To the inner face of the rear end wall portion of the cover member 36 is fixedly attached an electrically non-conductive contact support member 47 by suitable fastening means such as screws 48 as shown. The contact support member 47 has a dished central portion spaced apart inwardly or forwardly from the inner face of the rear end wall portion 36a of the cover member 36. An open space is thus formed between the central portion of the contact support member 47 and the inner face of the end wall portion 36a. A pair of electrically conductive contact elements 49 and 50 are fixedly attached to the inner or rear face of the dished central portion of the contact support member 47. These contact elements 49 and 50 are positioned to be respectively engageable with the contact elements 45 and 46 on the plunger 42.

When the push-button element 43 is depressed inwardly or forwardly, the plunger 42 is forced to axially move inwardly or forwardly through the opening 41 against the force of the spring 44 until the contact elements 45 and 46 on the plunger 42 are brought into pressing contact with the contact elements 49 and 50, respectively, on the contact support member 47. Under these conditions, an electric conduction path is formed between the contact elements 49 and 50 through the contact element 45, plunger 42 and contact element 46. The contact support member 47 is formed with two openings 51 and 52 which are located in the neighborhood of the contact elements 49 and 50, respectively.

A first insulation-covered lead wire 53 is anchored at one end thereof to one of the contact elements on the support member 47 such as for example the contact element 49 and, likewise, a second insulation-covered lead wire 54 is anchored at one end thereof to the other of the contact elements such as the contact element 50 as shown. The first insulation-covered lead wire 53 is passed through the opening 51 in the support member 47 and is anchored at the other end thereof to one of the screws 39 providing the mechanical and electrical connection between the barrel and cover members 35 and 36 (FIG. 2). As a result, the contact element 49 on the contact support member 47 is grounded through an electric conduction path constituted by the lead wire 53, one of the screws 39, the barrel member 35, the ball bearing 37 and the steering shaft 23. On the other hand, the second insulation-covered lead wire 54 is passed through the opening 52 in the contact support member 47 and is anchored at the other end thereof to a first fitting element 55 radially outwardly projecting from the outer peripheral surface of the barrel member 35 as shown in FIG. 2. The first fitting element 55 is secured to the barrel member 35 through an electric insulator (not shown) and is thus electrically isolated per se from the barrel member 35. When the horn switch device 40 shown in FIG. 3 is closed with the push-button element 43 depressed axially inwardly, the first fitting element 55 on the barrel member 35 is therefore grounded by way of the lead wire 54, switch device 40 and lead wire 53 and further through one of the screws 39, barrel member 35, bearing 37 and steering shaft 23. The first fitting element 55 is located close to the rear axial end of the barrel member 35. The barrel member 35 has further fixed on its outer peripheral surface a second fitting element 56 which is directly secured to and accordingly electrically connected to the barrel member 35. The second fitting element 56 is shown located axially halfway of the barrel member 35.

The barrel member 35 has mounted thereon first and second annular members 57 and 58 which are securely attached to the outer peripheral surface of the barrel member 35. The first annular member 57 is located axially intermediate between the first and second fitting elements 55 and 56, while the second annular member 58 is shown located at the front axial end of the barrel member 35. Thus, the barrel member 35 has a first outer peripheral surface axially extending between the first annular member 57 and the rear axial end of the barrel member 35, and a second outer peripheral surface axially extending between the first annular member 57 and the front axial end of the barrel member 35, or more specifically, between the first and second annular members 57 and 58. The above mentioned first and second fitting elements 55 and 56 are located on these first and second outer peripheral surfaces, respectively, of the barrel member 35.

The first and second outer peripheral surfaces of the barrel member 35 in the embodiment of FIG. 2 constitute first and second outer peripheral surface portions, respectively, of the previously mentioned first spool means of the steering mechanism according to the present invention. The first and second outer peripheral surfaces of the barrel member 35 have respective diameters which are preferably equal to each other, as will be seen from the illustration of FIG. 2. If desired, each of the annular members 57 and 58 may be integral with the barrel member 35.

In the embodiment of the steering mechanism shown in FIG. 2, furthermore, the steering column tube 22 has rotary guide means mounted thereon. As will be better seen from FIG. 4, the rotary guide means comprises a circumferentially grooved guide reel 59 which is rotatably mounted on the outer peripheral surface of the rear end portion of the steering column tube 22 by means of a screw 60 perpendicularly screwed in part into the steering column tube 22. The guide reel 59 is thus rotatable about an axis which is perpendicular and fixed with respect to the steering column tube 22. The steering column tube 22 has further formed in its rear end portion a guide hole 61 located in the vicinity of the reel 59 and has fixedly mounted on this end portion a fitting element 62 which is located forward of the guide hole 61.

The steering column tube 22 also has mounted thereon first and second annular members 63 and 64 which are securely attached to the outer peripheral surface of the rear end portion of the column tube 22. The first annular member 63 is shown located at or close to the rear axial end of the steering column tube 22, while the second annular member 64 is located axially intermediate between the above mentioned guide reel 59 and fitting element 62. Thus, the steering column tube 22 has a first outer peripheral surface axially extending between the first annular member 63 and the rear axial end of the column tube 22 or, more specifically, between the first and second annular members 63 and 64, and a second outer peripheral surface axially extending a certain length forwardly from the second annular member 64. The above described rotary guide means and the fitting element 62 are located within the areas of these first and second outer peripheral surfaces, respectively, of the steering column tube 22.

The first and second outer peripheral surfaces of the steering column tube 22 in the embodiment of FIG. 2 constitute first and second outer peripheral surface portions, respectively, of second line or harness wind-up means of the steering mechanism according to the present invention. The first and second outer peripheral surfaces of the steering column tube 22 have respective diameters which are preferably equal to each other and further to the diameters of the first and second outer peripheral surfaces of the barrel member 35, as will be seen from the illustration of FIG. 2. Furthermore, each of the first and second annular members 63 and 64 may be integral with the steering column tube 22.

The above mentioned first and second outer peripheral surfaces of the steering column tube 22 are enclosed within a partially frusto-conical and partially cylindrical cover member 65 which is secured to the steering column tube 22 by means of screws 66. The second outer peripheral surface of the steering column tube 22 is, thus, defined between the second annular member 64 and a front end portion of the cover member 65. The steering column tube 22 is formed with a guide hole 67 located forward of the cover member 65.

The steering mechanism shown in FIG. 2 further comprises flexible first and second wire harnesses 68 and 69 each including at least one insulation-covered wire. The first wire harness 68 is anchored at one end thereof to the first fitting element 55 on the barrel member 35 and is electrically connected to the lead wire 54 (FIG. 3) which is also anchored to the fitting element 55. The wire harness 68 thus leading from the fitting element 55 is partially wound helically on the first outer peripheral surface of the barrel member 35 in a forwardly clockwise direction about the center axis of the barrel member 35 when viewed from the rear side of the barrel member 35. The first wire harness 68 further leads from the first outer peripheral surface of the barrel member 35 and is forwardly passed through the first axial passageway 32 in the central hub portion 29 of the steering wheel structure 27.

The wire harness 68 extending forwardly from the passageway 32 is wound helically on the first outer peripheral surface of the steering column tube 22 in same direction as the direction of helix of the harness 68 on the first outer peripheral surface of the barrel member 35, for example, in a forwardly clockwise direction about the center axis of the steering column tube 22 when viewed from the rear side of the column tube 22. The wire harness 68 leading from the first outer peripheral surface of the steering column tube 22 is passed round the grooved guide reel 59 on the steering column tube 22 and is, past the reel 59, directed into the internal open space in the column tube 22 through the guide hole 61 in the tube 22. The wire harness 68 thus entering the internal space of the steering column tube 22 extends a certain distance through the space until the harness 68 is allowed out of the column tube 22 through the guide hole 67 in the tube 22. The wire harness 68 extending from the guide hole 67 is anchored at its leading end to a suitable electric actuator circuit such as, for example, a relay (not shown) of the horn system.

On the other hand, the second wire harness 69 is anchored at one end to the second fitting element 56 on the barrel member 35 and is partially wound helically on the second outer peripheral surface of the barrel member 35 in a direction opposite to the direction of helix of the harness 68, for example, in a forwardly counter-clockwise direction about the center axis of the barrel member 35 when viewed from the rear side of the barrel member 35. The second wire harness 69 leading from the second outer peripheral surface of the barrel member 35 is forwardly passed through the second axial passageway 33 in the hub portion 29 of the steering wheel structure 27.

The wire harness 69 extending forwardly from the front end of the passageway 33 is helically wound on the second outer peripheral surface of the steering column tube 22 in the same direction as the direction of helix of the harness 68 on the second outer peripheral surface of the barrel member 35, viz., in a forwardly counter-clockwise direction about the center axis of the steering column tube 22 when viewed from the rear side of the column tube 22. The wire harness 69 leaving from the second outer peripheral surface of the steering column tube 22 is anchored and electrically connected to the fitting element 62 on the column tube 22. The second wire harness 69 is assumed to be a purely mechanical component of the steering mechanism and, thus, does not form part of the electric wiring arrangement of the horn system.

Each of the first and second wire harnesses 68 and 69 thus disposed in the steering mechanism is arranged to be maintained taut with a predetermined tension applied thereto. In the arrangement shown in FIG. 2, furthermore, the steering wheel structure 27 is assumed to be held in a clockwise limit angular position about the center axis thereof when viewed from the rear side of the wheel structure 27. Thus, the first wire harness 68 is shown in a condition almost completely unwound from the first outer peripheral surface of the steering column tube 22 and, likewise, the second wire harness 69 is shown in a condition almost completely unwound from the second outer peripheral surface of the barrel member 35.

When, now, a driver's effort is applied to the steering wheel structure 27 so that the wheel structure 27 is caused to make a counter-clockwise turn from the above mentioned clockwise limit angular position thereof, the turning motion of the steering wheel structure 27 is transmitted through its central hub portion 29 and its boss portion 30 to the steering shaft 23. The turning motion of the steering shaft 23 in turn is transmitted to the steering gear mechanism (not shown), which therefore operates the front road wheels to steer the vehicle.

The counter-clockwise turning of the hub portion 29 of the steering wheel structure 27 causes each of the first and second wire harnesses 68 and 69 to turn counter-clockwise around the barrel member 35 and the steering column tube 22 which is held stationary with respect to the vehicle body structure. As a consequence, the first wire harness 68 is caused to be partially unwound from the first outer peripheral surface of the barrel member 35 and additionally wound on the first outer peripheral surface of the steering column tube 22. On the other hand, the second wire harness 69 is caused to be partially unwound from the second outer peripheral surface of the steering column tube 22 and additionally wound on the second outer peripheral surface of the barrel member 35. It therefore follows that the barrel member 35 is urged to turn clockwise by the tension in the first wire harness 68 and is urged to turn counter-clockwise by the tension in the second wire harness 69. If, therefore, the tensions in the two wire harnesses 68 and 69 are equal to each other, the forces thus urging the barrel member 35 to turn in the opposite directions are cancelled by each other. The barrel member 35 or, accordingly, the switch support structure 34 as a whole is for this reason held substantially stationary with respect to the steering column tube 22 irrespective of the turning motion of the steering wheel structure 27. In a like manner, the switch support structure 34 is maintained substantially at a standstill with respect to the steering column tube 22 when the steering wheel structure 27 is being turned back clockwise from the position thus reached.

Figure 5:
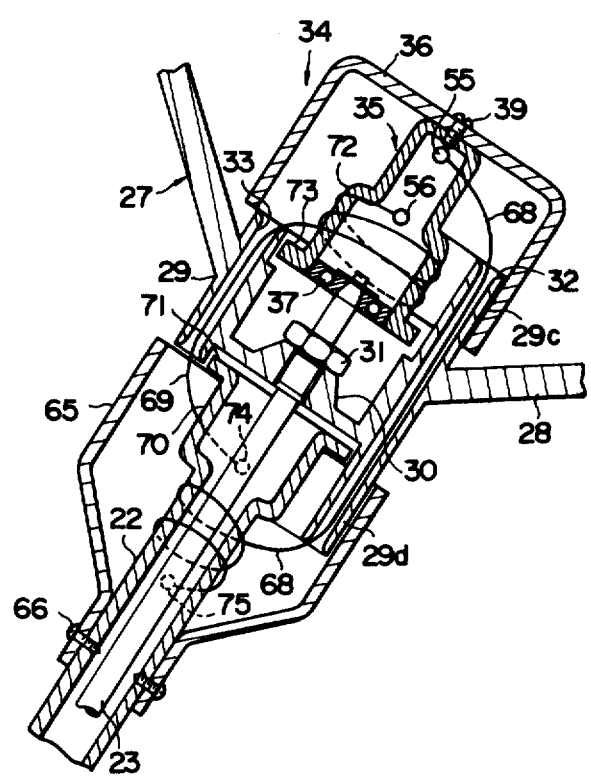
FIG. 5 is a view similar to FIG. 2 but shows a second embodiment of the steering mechanism according to the present invention.

In the embodiment of the steering mechanism hereinbefore described, the annular members 57 and 58 on the barrel member 35 and the annular members 63 and 64 on the steering column tube 22 not only define distinctly the respective first and second outer peripheral surfaces of the barrel member 35 and the column tube 22 but are conducive to preventing the wire harnesses 68 and 69 from being entwined round each other around the barrel member 35 and the column tube 22. Such annular members may therefore be dispensed with if functions substantially similar to those of the annular members can be achieved in different manners. FIG. 5 shows an embodiment adapted to realize this purpose.

In FIG. 5, there are shown only those members and structures which are necessary for the understanding of the difference of the embodiment shown therein from the embodiment shown in FIG. 2. Furthermore, the members and structures respectively corresponding to those of the embodiment of FIG. 2 are designated by like reference numerals. In FIG. 5, a horn switch device is mounted on the cup-shaped rear end cover 36 of the switch support structure 34 similarly to the horn switch device 40 provided in the embodiment of FIG. 2 but is herein omitted from illustration.

In the embodiment of FIG. 5, the steering column tube 22 has a radially enlarged rear end portion 70 having an annular projection or flange portion 71 at its rear axial end. Thus, the steering column tube 22 having the enlarged rear end portion 70 has a first outer peripheral surface constituted by the outer peripheral surface of the rear end portion 70 and a second outer peripheral surface constituted by an outer peripheral surface portion axially extending forward from the rear end portion 70.

Furthermore, the barrel member 35 forming part of the switch support structure 34 in the embodiment of FIG. 5 has a radially enlarged front axial portion 72 having an annular projection or flange portion 73 at its front axial end. The barrel member 35 thus having the enlarged front axial portion 72 has a first outer peripheral surface constituted by the outer peripheral surface of the remaining axial portion of the barrel member 35 and a second outer peripheral surface constituted by the outer peripheral surface of the enlarged front axial portion 72.

The arrangement of the first and second wire harnesses 68 and 69 in the embodiment of FIG. 5 is somewhat different from the arrangement of the wire harnesses 68 and 69 in the embodiment of FIG. 2. In the embodiment of FIG. 5, the first wire harness 68 anchored at one end to the first fitting element 55 on the barrel member 35 is partially wound helically on the above mentioned first outer peripheral surface of the barrel member 35 and, past the first axial passageway 32 in the hub portion 29 of the steering wheel structure 27, further on the second outer peripheral surface of the steering column tube 22. On the other hand, the second wire harness 69 anchored at one end to the second fitting element 56 on the barrel member 35 is partially wound helically on the second outer peripheral surface of the barrel member 35 and, past the second axial passageway 33 in the hub portion 29, further on the first outer peripheral surface of the steering column tube 22. The first wire harness 68 is, furthermore, shown wound forwardly counterclockwise on the first and second outer peripheral surfaces of the barrel member 35 and the steering column tube 22, respectively. On the other hand, the second wire harness 69 is shown wound forwardly clockwise on the second and first outer peripheral surfaces of the barrel member 35 and the steering column tube 22, respectively. The first and second wire harnesses 68 and 69 are anchored at the other ends thereof to fitting elements 74 and 75, respectively, which are secured to the steering column tube 22 and which are located on the first and second outer peripheral surfaces, respectively, of the column tube 22. Though not shown in FIG. 5, the first wire harness 68 anchored to the fitting element 75 is electrically connected to a wire harness leading from an electric actuator circuit of the horn system.

In the above described embodiment of the steering mechanism shown in FIG. 5, the first outer peripheral surface of the barrel member 35 is, preferably, substantially equal in diameter to the second outer peripheral surface of the steering column tube 22 and, likewise, the second outer peripheral surface of the barrel member 35 is, preferably, substantially equal in diameter to the first outer peripheral surface of the steering column tube 22.

In the embodiment of FIG. 5, furthermore, the central hub portion 29 of the steering wheel structure 27 has two axial extensions 29c and 29d which project rearwardly and forwardly, respectively, from the hub portion 29. The rearward and forward axial extensions 29c and 29d are axially aligned with each other in parallel with the center axis of the boss portion 30 and are respectively formed with rearward and forward extensions of the first axial passageway 32 in the hub portion 29. The rearward extension 29c preferably has its open rear end located in the neighborhood of the junction between the first and second outer peripheral surfaces of the barrel member 35, while the forward extension 29d preferably has its open front end located in the neighborhood of the junction between the first and second outer peripheral surfaces of the steering column tube 22 as shown.

The above described arrangement of the extensions 29c and 29d of the hub portion 29 in the embodiment of FIG. 5 is useful for preventing the first and second wire harnesses 68 and 69 from being twined round each other around the barrel member 35 and the steering column tube 22. To achieve similar effects in the embodiment of FIG. 2, the rearward and forward extensions 29a and 29b of the hub portion 29 may be arranged to terminate in the neighborhood of the respective junctions between the first and second outer peripheral surfaces of the barrel member 35 and between the first and second outer peripheral surfaces of the steering column tube 22 as shown.

In each of the embodiments shown in FIGS. 2 and 5, the first wire harness 68 is assumed to be part of the wiring arrangement of the horn, while the second wire harness 69 is assumed to be a merely mechanical component of the steering mechanism as previously noted. The first harness 68 thus serving as electric conductor means may be partially reduced in cross section or may have a portion constituted by a thinner wire harness so that the wire harness 68 can be readily broken to guarantee the safety of steering when the harness 68 is subjected to an excessively intense tension.

FIGS. 6 to 14 of the drawings show a third embodiment of the steering mechanism according to the present invention.

Figure 6:
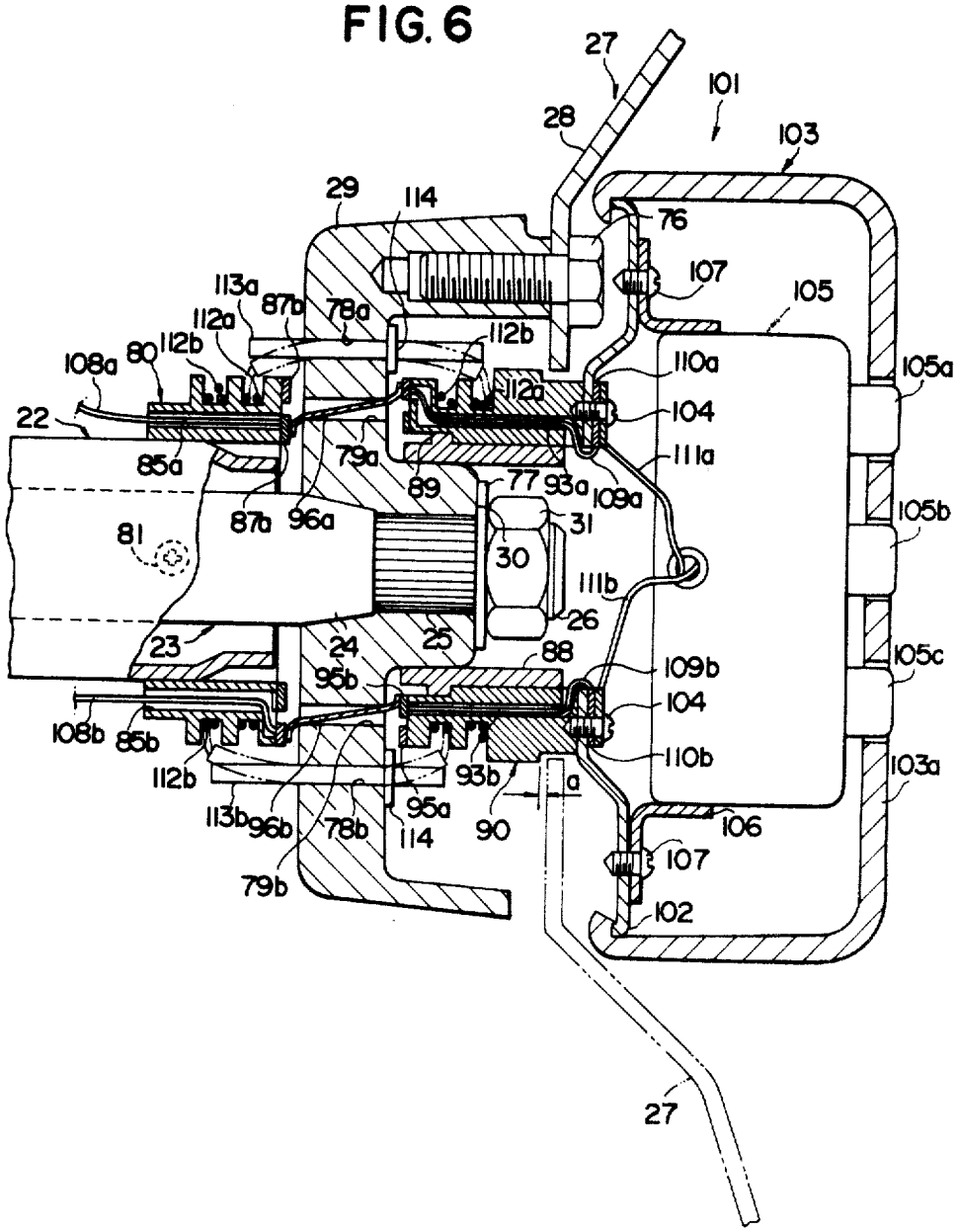
FIG. 6 is a fragmentary longitudinal sectional view of a third embodiment of the steering mechanism according to the present invention.
Figure 7:
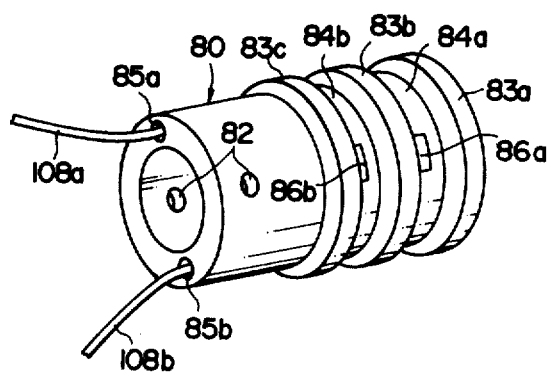
FIG. 7 is a perspective view showing a front spool member included in the embodiment of FIG. 6.
Figure 8:
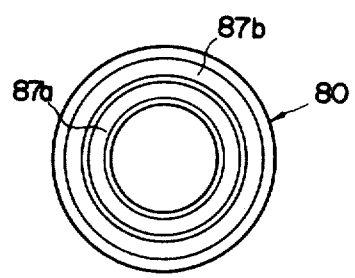
FIG. 8 is a front end view of the spool member shown in FIG. 7.

Referring to FIGS. 6 to 14, first particularly to FIG. 6 thereof, the steering mechanism herein shown is, by way of example, also assumed to form part of a steering system of an automotive vehicle and, thus, comprises a hollow steering column tube 22 and a steering shaft 23 which are arranged similarly to their respective counterparts in the embodiment of FIG. 2.

The steering shaft 23 has a rear axial extension having a rearwardly tapered axial portion 24 axially projecting outwardly from the rear end of the steering column tube 22, and a serrated axial portion 25 extending rearwardly from the tapered axial portion 24. The extension of the steering shaft 23 further has a threaded end portion 26' extending rearwardly from the serrated axial portion 25.

The steering mechanism shown in FIG. 6 further comprises a steering wheel structure 27 which is shown only partially. The steering wheel structure 27 has a circular rim portion (not shown) and a plurality of radial spoke portions 28 radially extending inwardly from the rim portion in a forwardly tapering, generally frusto-conical configuration. The steering wheel structure 27 is further shown comprising a hollow, generally drum-shaped central hub member 29 which is coaxial with the rim portion. The central hub member 29 has a cylindrical side wall to which the individual spoke portions 28 of the steering wheel structure 27 are securely connected by bolts one of which is shown at 76. The hub member 29 is formed with a rearwardly open concavity and has a front end wall portion having an inner or rear face defining the front end of the concavity.

The hub member 29 has a cylindrical boss portion 30 axially projecting rearwardly from the above mentioned front wall of the hub member 29 into the concavity in the hub member 29. The boss portion 30 is coaxially surrounded by the inner peripheral wall of the hub portion 29 and is formed with an axial bore which is open at both ends thereof. The axial bore in the boss portion 30 is formed conformingly to the tapered and serrated axial portions 24 and 25. The steering wheel structure 27 as a whole is fitted to the steering shaft 23 with the tapered and serrated axial portions 24 and 25 of the shaft 23 passed through the axial bore in the boss portion 30 and with the threaded rear end portion 26' of the shaft 23 projecting rearwardly from the boss portion 30 as shown. The steering wheel structure 27 is secured to the steering shaft 23 by means of a clamping nut 31 which is screwed on the threaded rear end portion 26' of the steering shaft 23 to the rear end face of the boss portion 30 through a washer 77. The axial bore in the boss portion 30 is aligned with the center axis of the steering shaft 23 so that the steering wheel structure 27 as a whole is held in coaxial relationship to the steering shaft 23 and accordingly to the steering column tube 22.

The central hub member 29 of the steering wheel structure 27 thus constructed and arranged has formed in its front end wall portion a first pair of axial holes 78a and 78b and a second pair of axial holes 79a and 79b. Each of the holes axially extends substantially in parallel with the center axis of the hub member 29 and is open forwardly at the front end of the hub member 29 and rearwardly into the concavity in the hub member 29. The axial holes 78a and 78b of the first pair are disposed substantially in diametrically opposite relationship to each other across the center axis of the hub member 29. The axial holes 79a and 79b of the second pair are also located substantially in diametrically opposed relationship to each other across the center axis of the hub member 29 and further radially inwardly of the axial holes 78a and 78b of the first pair, as will be seen from FIG. 6.

The embodiment of the steering mechanism shown in FIG. 6 further comprises a hollow, generally cylindrical front spool member 80 which is coaxially secured to the outer peripheral surface of a rear end portion of the steering column tube 22 by suitable fastening means such as screws one of which is shown by dotted lines at 81 in FIG. 6. The spool member 80 is formed with screw holes as indicated at 82 in FIG. 7 and is secured to the steering column tube 23 with the screws 81 fitted into the column tube 23 through these screw holes 82.

The front spool member 80 is formed with three annular projections or flange portions which consist of a rearmost or first flange portion 83a, an intermediate or second flange portion 83b and a foremost or third flange portion 83c. As will be better seen from FIG. 7, the first, second and third flange portions 83a, 83b and 83c are axially spaced apart from each other so that the spool member 80 has a rear or first outer peripheral surface 84a between the first and second annular flange portions 83a and 83b and a front or second outer peripheral surface 84b between the second and third flange portions 83b and 83c.

The front spool member 80 is further formed with first and second axial passageways 85a and 85b each open at both axial ends of the spool member 80. The first and second axial passageways 85a and 85b are located substantially in diametrically opposite relationship to each other across the center axis of the spool member 80. The front spool member 80 is further formed with two radial openings 86a and 86b which are radially inwardly open at the inner peripheral surface of the spool member 80 and radially outwardly open at the above mentioned first and second outer peripheral surfaces 84a and 84b, respectively. The front spool member 80 configured as described above is constructed of a suitable electrically non-conductive material.

The front spool member 80 has radially inner and outer or first and second annular contact elements 87a and 87b sucurely attached to the rear end face of the spool member 80. The first and second annular contact elements 87a and 87b are radially spaced apart from each other and are substantially coaxial with respect to the spool member 80 as will be seen from FIG. 8. The annular contact elements 87a and 87b are located adjacent to and slightly spaced apart forwardly from the outer face of the front end wall portion of the central hub member 29 as will be seen from FIG. 6.

The steering mechanism shown in FIG. 6 further comprises a cylindrical sleeve bearing 88 which is secured to the outer peripheral surface of the cylindrical boss portion 30 of the central hub member 29. The sleeve bearing 88 axially projects rearwardly form the rear end of the boss portion 30 and coaxially surrounds the nut 31 engaging the threaded rear end portion 26' of the steering column shaft 23. Furthermore, the sleeve bearing 88 has an annular projection or flange portion 89 located adjacent to the front axial end of the sleeve bearing 88, viz., to the inner face of the front end wall portion of the hub member 29. The flange portion 89 is located a predetermined axial distance from the rear end of the sleeve member 88 for the reason which will be clarified later. The sleeve bearing 88 has a smooth outer peripheral surface axially extending between the flange portion 89 and the rear axial end of the bearing 88 and serving as a bearing surface.

A hollow, generally cylindrical rear spool member 90 is coaxially received on this bearing surface of the sleeve bearing 88 and is axially and circumferentially slidable thereon. As will be better seen from FIGS. 9 and 10, the rear spool member 90 is formed with three annular projections or flange portions which consist of a rearmost or first flange portion 91a, an intermediate or second flange portion 91b and a foremost or third flange portion 91c. The first, second and third flange portions 91a, 91b and 91c are axially spaced apart from each other so that the spool member 90 has a rear or first outer peripheral surface 92a between the first and second flange portions 91a and 91b and a front or second outer peripheral surface 92b between the second and third flange portions 91b and 91c.

Figure 9:
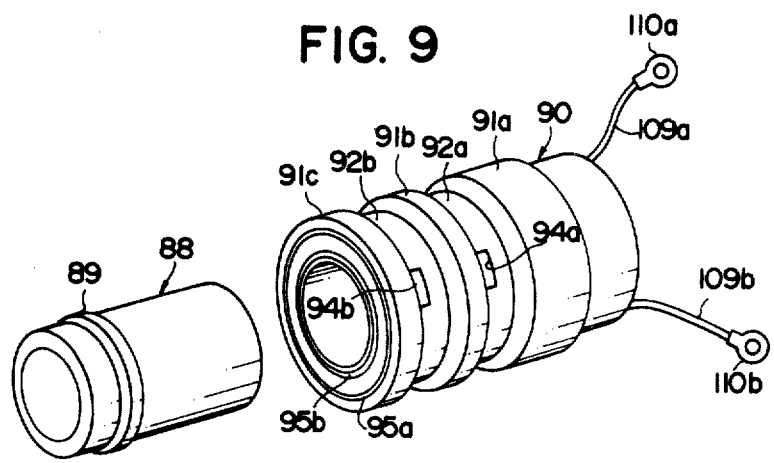
FIG. 9 is an exploded perspective view showing a rear spool member and an associated sleeve bearing also included in the embodiment illustrated in FIG. 6.
Figure 10:
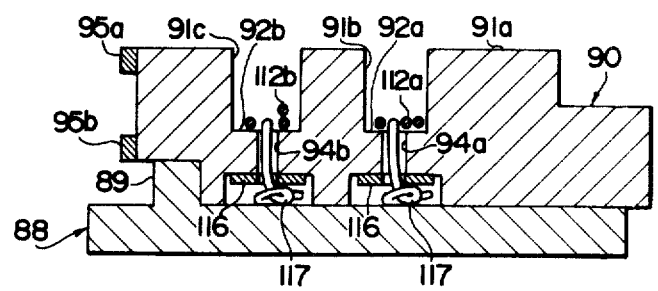
FIG. 10 is a sectional view showing portions of the rear spool member and the sleeve bearing illustrated in FIG. 9.
Figure 11:
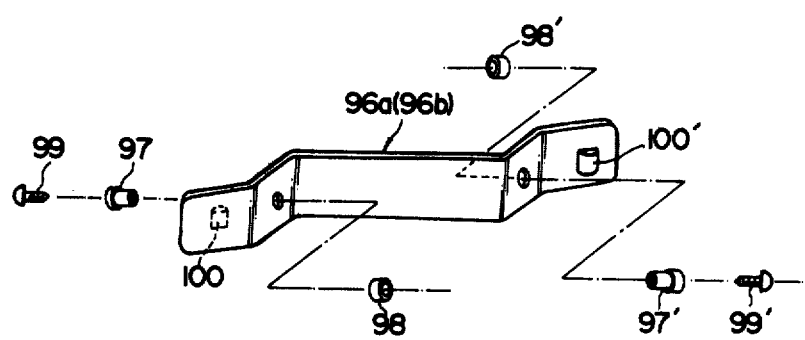
FIG. 11 is an exploded perspective showing a conductive strip member and associated elements further included in the embodiment of FIG. 6.
Figure 12:
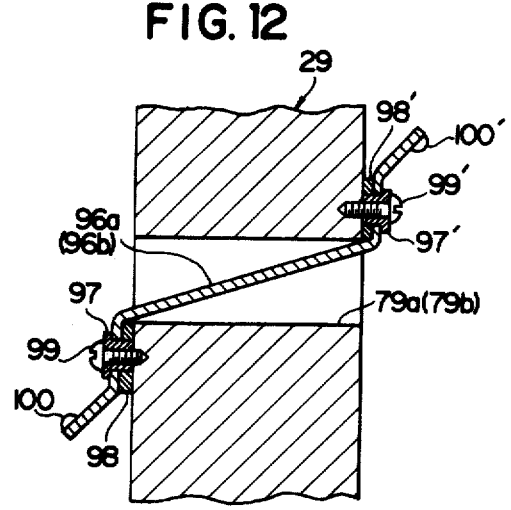
FIG. 12 is a fragmentary sectional view showing the arrangement in which the conductive strip member illustrated in FIG. 11 is held in position in the embodiment of FIG. 6.

The rear spool member 90 is further formed with first and second axial passageways 93a and 93b each open at both axial ends of the spool member 90, as shown in FIG. 6. The first and second axial passageways 93a and 93b are located substantially in diametrically opposed relationship to each other across the center axis of the spool member 90. The rear spool member 90 is further formed with two radial openings 94a and 94b which are radially inwardly open at the inner peripheral surface of the spool member 90 and radially outwardly open at the above mentioned first and second outer peripheral surfaces 92a and 92b, respectively, as shown in FIGS. 9 and 10.

The rear spool member 90 thus configured is axially and circumferentially slidable on the previously mentioned bearing surface of the sleeve bearing 88 and axially projects rearwardly beyond the rear end of the sleeve bearing 88. The axial movement of the spool member 80 toward the front end wall portion of the hub member 29 is limited by the flange portion 89 of the sleeve bearing 88. The spool member 90 is, furthermore, constructed of a suitable electrically nonconductive material.

The rear spool member 90 has radially outer and inner or first and second annular contact elements 95a and 95b securely attached to the front end face of the spool member 90. The first and second contact elements 95a and 95b are radially spaced apart from each other and are substantially coaxial with respect to the spool member 90, as will be best seen from FIG. 10. The annular contact elements 95a and 95b are located adjacent to and slightly spaced apart rearwardly from the inner face of the front end wall portion of the central hub member 29 as will be seen from FIG. 6.

The rear spool member 90 on the sleeve bearing 88 constitutes the first spool means in the steering mechanism according to the present invention. Likewise, the previously described front spool member 80 constitutes the second spool means in the steering mechanism according to the present invention.

The first and second contact elements 87a and 87b on the front spool member 80 are electrically connected to the first and second contact elements 95a and 95b, respectively, on the rear spool member 90 by slidable connector means. In FIG. 6, such connector means is shown comprising first and second conductive strip members 96a and 96b each constructed of an elastic, electrically conductive material. The first and second conductive 96a and 96b are securely fitted to the front end wall portion of the central hub member 29 through the axial holes 79a and 79b, respectively, in the wall portion. As illustrated to enlarged scales in FIGS. 11 and 12, each of the strip members 96a and 96b has a straight intermediate longitudinal portion and two pairs of portions bent from the former. The intermediate longitudinal portion of each of the strip members 96a and 96b is arranged to slantwise extend through each of the axial holes 79a and 79b in the front end wall of the hub member 29. One of the two bent portions directly merging in opposite directions from the intermediate longitudinal portion of each strip member is located adjacent to the front end of each of the holes 79a and 79b and is securely attached through insulating elements 97 and 98 to the outer or front end face of the front end wall portion of the hub member 29 by means of a screw 99. Similarly, the other of the above mentioned two bent portions is located adjacent to the rear end of each of the holes 79a and 79b and is securely attached through insulating elements 97' and 98' to the inner or rear end face of the front wall portion of the hub member 29. The bent end portions of each strip member project sidewise forwardly and rearwardly from the outer and inner or front and rear end faces, respectively, of the front end wall portion of the hub member 29 and are elastically deformable toward and away from these end faces, respectively. Each of the strip members 96a and 96b has contact elements 100 and 100' secured in a suitable manner to the opposite faces of the front and rear bent end portions, respectively, of the strip member.

The contact elements 100 on the respective front bent end portions of the first and second conductive strip members 96a and 96b are elastically pressed against the first and second contact elements 87a and 87b, respectively, on the rear end face of the front spool member 80. Likewise, the contact elements 100' on the respective rear bent end portions of the first and second conductive strip members 96a and 96b are elastically pressed against the first and second contact elements 95a and 95b, respectively, on the front end face of the rear spool member 90. Thus, the first conductive strip member 96a provides sustained electrical connection between the first contact element 87a on the front spool member 80 and the first contact elements 95a on the rear spool member 90. Likewise, the second conductive strip member 96b provides sustained electrical connection between the second contact element 87b on the front spool member 80 and the second contact element 95b on the rear spool member 90.

The embodiment of the steering mechanism as shown in FIG. 6 further comprises an accessory switch support stucture 101 which is largely composed of an annular bracket member 102 and a generally drum-shaped finisher or rear end cover member 103. The rear end cover member 103 has a cylindrical side wall portion secured along its front circumferential end to an outer circumferential end portion of the bracket member 102. The rear end cover member 103 further has a rear end wall portion 103a rearwardly spaced apart from the bracket member 102 so as to form an open internal space therebetween. The bracket member 102 is securely attached along its inner circumferential end portion to the rear end face of the rear spool member 90 by suitable fastening means such as screws 104 as shown.

Within the open internal space thus formed in the accessory switch support structure 101 is positioned an electric switch assembly 105. The switch assembly 105 is supported by the annular bracket member 102 through a bracket member 106 secured to the bracket member 102 by screws 107 as shown. The switch assembly 105 is shown having three switching push-buttons 105a, 105b and 105c projecting rearwardly through openings formed in the rear end wall portion 103a of the cover member 103.

The steering mechanism illustrated in FIG. 6 further comprises wire harness arrangements. Such arrangements comprise first and second electric wire harnesses 108a and 108b which extend, though not shown, from the electric circuits of suitable electrically operated vehicular instruments such as, for example, an electric warning horn, a motor-driven wind-shield wiper and a drive computer (not shown). The first and second wire harnesses 108a and 108b are passed through the first and second axial passageways 85a and 85b, respectively, in the front spool member 80 and are anchored and electrically connected at their leading ends to the first and second contact elements 87a and 87b, respectively, on the rear end face of the spool member 80.

The wire harness arrangements further comprise third and fourth wire harnesses 109a and 109b passed through the first and second axial passageways 93a and 93b, respectively, in the rear spool member 90. The third and fourth wire harnesses 109a and 109b are anchored and electrically connected each at one end thereof to the first and second contact elements 95a and 95b, respectively, on the front end face of the rear spool member 90. The third wire harness 109a is anchored at the other end thereof to fittings 110a securely attached to the rear end face of the rear spool member 90 by means of one of the previously mentioned screws 104, while the fourth wire harness 109b is anchored at the other end thereof to fittings 110b which are securely attached to the rear end face of the spool member 90 by another one of the screws 104, as shown.

The wire harness arrangements of the steering mechanism illustrated in FIG. 6 are complete with fifth and sixth wire harnesses 111a and 111b which are anchored each at one end thereof to the above mentioned fittings 110a and 111b, respectively, by the screws 104. These fifth and sixth wire harnesses 111a and 111b are electrically connected to the second and third wire harnesses 109a and 109b, respectively, and extend into the previously described switch assembly 105. The wire harnesses 111a and 111b are thus electrically connected to the various switch elements (not shown) forming part of the switch assembly 105 and associated with the push-buttons 105a, 105b and 105c.

The steering mechanism shown in FIG. 6 further comprises cord arrangements providing mechanical coupling between the front and rear spool members 80 and 90 therethrough. Such cord arrangements comprise a pair of lengthy, flexible cords consisting of first and second cords 112a and 112b of, for example, a resilient synthetic resin such as Nylon.

Figure 13:
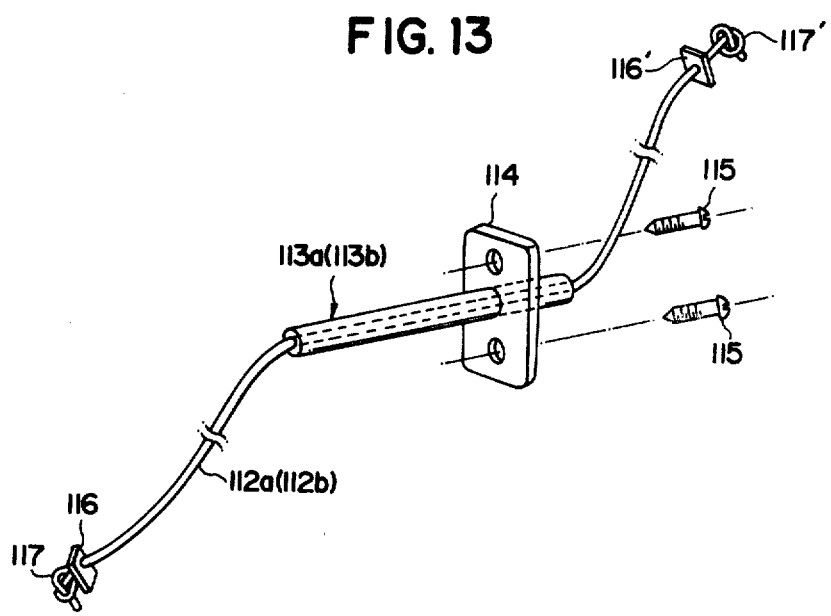
FIG. 13 is a fragmentary perspective view showing a flexible cord and associated elements further incorporated in the embodiment illustrated in FIG. 6.

The cord arrangement further comprises elastic first and second guide tubes 113a and 113b which are closely passed through the previously mentioned axial holes 78a and 78b, respectively, in the front end wall portion of the hub member 29. Each of the guide tubes 113a and 113b has a front end portion axially projecting forwardly from the hub member 29 and a rear end portion axially projecting rearwardly from the hub member 29. The front end portions of the first and second guide tubes 113a and 113b terminate in the neighborhood of the first and second outer peripheral surfaces 84a and 84b, respectively, of the front spool member 80. On the other hand, the rear end portions of the first and second guide tubes 113a and 113b terminate in the neighborhood of the first and second outer peripheral surfaces 92a and 92b, respectively, of the rear spool member 90. As illustrated to an enlarged scale in FIG. 13, each of the guide tubes 113a and 113b has a flange 114 securely mounted or integrally formed thereon. The flange 114 of each guide tube is fixedly attached to the inner or rear end face of the front end wall portion of the central hub member 29 by suitable fastening means such as screws 115 as shown in FIG. 13. The guide tubes 113a and 113b are thus secured to the end wall portion of the hub member 29.

The first and second cords 112a and 112b are slidably passed, each partially, through these first and second guide tubes 113a and 113b, respectively. The first cord 112a passed in part through the first guide tube 113a extends forwardly and rearwardly from the opposite ends of the tube 113a and has opposite end portions wound on the first outer peripheral surfaces 84a and 92a, respectively, of the front and rear spool members 80 and 90. Likewise, the second cord 112b passed through the second guide tube 113b extends forwardly and rearwardly from the opposite ends of the tube 113b and has its opposite end portions wound on the second outer peripheral surfaces 84b and 92b, respectively, of the front and rear spool members 80 and 90. The directions in which the first cord 112a is wound on the outer peripheral surfaces 84a and 92a of the front and rear spool members 80 and 90 about the respective center axes of the spool members are identical. Similarly, the directions in which the second cord 112b is wound on the outer peripheral surfaces 84b and 82b of the front and rear spool members 80 and 90 about the respective center axes of the spool members are identical but opposite to the winding directions of the first cord 112a. In the arrangement shown in FIG. 6, it is assumed, by way of example, that the first cord 112a is wound in a clockwise direction on the first outer peripheral surface 84a of the front spool member 80 and on the first outer peripheral surface 91a of the rear spool member 90 when viewed from the rear sides of the spool members 80 and 90. On the other hand, the second cord 112b is assumed to be wound in a counter-clockwise direction on the second outer peripheral surface 84b of the front spool member 80 and on the second outer peripheral surface 92b of the rear spool member 90 when viewed from the rear sides of the spool members 80 and 90.

The first cord 112a has one of its opposite extreme end portions passed into the radial opening 86a in the front spool member 80 (FIG. 7) and the other of the extreme end portions passed into the radial opening 94a in the rear spool member 90 (FIGS. 9 and 10). Likewise, the second cord 112b has one of its opposite extreme end portions passed into the radial opening 86b in the front spool member 80 (FIG. 7) and the other of the extreme end portions passed into the radial opening 94b in the rear spool member 90 (FIGS. 9 and 10). The respective extreme end portions of the first and second cords 112a and 112b thus admitted into the radial openings 86a and 86b, respectively, of the front spool member 80 are passed through apertured retainer elements represented by a retainer element 116 in FIG. 13 and are formed with knots also represented by a knot 117 in FIG. 13. Each of the cords 112a and 112b is in this manner securely anchored at its foremost end in each of the radial openings 86a and 86b of the front spool member 80 with the knot 117 pressed onto the retainer element 116 which is firmly received in each of the openings 86a and 86b as will be seen by analogy from the illustration of FIG. 10. Similarly, the respective extreme end portions of the first and second cords 112a and 112b admitted into the radial openings 92a and 92b in the rear spool member 90 are passed through apertured retainer elements represented by a retainer element 116' in FIG. 13 and are formed with knots which are also represented by a knot 117' in FIG. 13. Each of the cords 112a and 112b is in this fashion securely anchored at its rearmost end in each of the radial openings 92a and 92b of the rear spool member 90 with the knot 117' pressed onto the retainer element 117' which is firmly received in each of the openings 92a and 92b, as will be seen from FIG. 10.

The knots 117 and 117' of each of the cords 112a and 112b are formed so that each cord is maintained taut between the front and rear spool members 80 and 90 with a certain tension constantly applied thereto.

When, now, a driver's turning effort is applied to the steering wheel structure 27, the turning motion of the wheel structure 27 is transmitted from the central hub member 29 to the steering shaft 23. The steering wheel structure 27 and the steering shaft 23 are therefore rotated as a single unit about the center axis of the shaft 23 with respect to the steering column tube 22 which is held stationary with respect to the vehicle body structure. The turning motion of the steering shaft 23 is transmitted to the steering gear mechanism (not shown) and thereby operates the steering linkage to steer the front road wheels of the vehicle.

If, in this instance, the steering wheel structure 27 is caused to turn clockwise as viewed from the rear side of the wheel structure 27, the first cord 112a leading from the guide tube 113a on the turning hub member 29 is caused to be partially unwound from the first outer peripheral surface 84a of the front spool member 80 and additionally wound on the first outer peripheral surface 92a of the rear spool member 90. At the same time, the second cord 112b leading from the guide tube 113b on the clockwise turning hub member 29 is caused to be partially unwound from the second outer peripheral surface 92b of the rear spool member 90 and additionally wound on the second outer peripheral surface 84b of the front spool member 80. As a consequence, the first cord 112a is partially transferred from the front spool member 80 to the rear spool member 90 through the first guide tube 113a, while the second cord 112b is partially transferred from the rear spool member 90 to the front spool member 80 through the second guide tube 113b. It therefore follows that the rear spool member 90 is urged to turn clockwise by the tension in the first cord 112a and counter-clockwise by the tension in the second cord 112b. The first and second cords 112a and 112b being arranged be taut with substantially equal tensions, the forces thus urging the rear spool member 90 to turn in the clockwise and counter-clockwise directions are cancelled by each other. The rear spool member 90 carrying the switch support structure 101 is for this reason caused to circumferentially slide on the previously mentioned bearing surface of the sleeve bearing 88 turning with the steering wheel structure 27 and the steering shaft 23. The rear spool member 90, switch support structure 101 and switch assembly 105 are, as a consequence, maintained in their initial angular positions with respect to the steering column tube 22 irrespective of the turning motions of the steering wheel structure 27 and the steering shaft 23. In a like manner, the rear spool member 90, switch support structure 101 and switch assembly 105 are held in situ when the steering wheel structure 27 is caused to turn counter-clockwise when viewed from the rear side of the structure 27.

When the first and second cords 112a and 112b are being transferred between the front and rear spool members 80 and 90 through the first and second guide tubes 113a and 113b, respectively, by the rotation of the steering wheel structure 27 with respect to the steering column tube 22, each of the guide tubes 113a and 113b is caused to elastically deflect toward the center axis of the steering shaft 23 as indicated by phantom lines in FIG. 6 by the tension in each of the cords 112a and 112b. Such deflection of the guide tubes 113a and 113b produces axial components in the tensions of the cords 112a and 112b being wound on and unwound from the rear spool member 90 which is axially slidable on the bearing surface of the sleeve bearing 88. The axial components of the tensions in the cords 112a and 112b urge the rear spool member 90 toward the front end wall portion of the hub member 29. The rear spool member 90 can therefore be moved with certainty into the axial position closely engaging the flange portion 89 of the sleeve bearing 88 by such axial components if the spool member 90 might have been rearwardly displaced a certain distance a (FIG. 6) from such an axial position before the wheel structure 27 is turned. The rear spool member 90 is in this manner elastically held in the axial position engaging the flange portion 89 of the sleeve bearing 88 so that the switch support structure 101 and the switch assembly 105 carried by the spool member 90 can be stably held in axial position with respect to the steering shaft 23, producing no noises and vibrations throughout steering operation.

Figure 14:
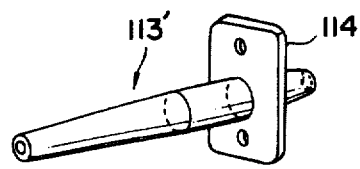
FIG. 14 is a perspective view showing an alternative example of a guide tube illustrated in FIG. 13.

In order to enhance the advantage thus achieved by the provision of the guide tubes 113a and 113b, each of the guide tubes may be substituted by a guide tube 113' having tapered opposite end portions as shown in FIG. 14 of the drawings.

During turning of the steering wheel structure 27 with respect to the steering column tube 22, the first and second conductive strip members 96a and 96b retained by the central hub member 29 of the steering wheel structure 27 are caused to turn together with the steering wheel structure 27 about the center axis of the steering shaft 23. Both of the front and rear spool members 80 and 90 being held at rest with respect to the steering column tube 22, the foremost and rearmost bent end portions of the first conductive strip member 96a are caused to slide on the annular first contact elements 87a and 95a, respectively, on the front and rear spool members 80 and 90. Likewise, the foremost and rearmost bent end portions of the second conductive strip member 96b are caused to slide on the annular second contact elements 87b and 95b, respectively, on the front and rear spool members 80 and 90. The electrical connection between the first and third wire harnesses 108a and 109a and the electrical connection between the second and fourth wire harnesses 108b and 109b are thus maintained independently of the turning motion of the steering wheel structure 27.

What is claimed is:

1. A steering mechanism for a steerable vehicle including a body structure having a fore-and-aft direction, comprising
   a hollow steering column tube held stationary with respect to said body structure,
   a steering shaft axially extending in and through said steering column tube and having a rear end portion projecting rearwardly from the column tube, the steering shaft having a center axis therethrough and being rotatable about the center axis,
   a steering wheel structure rotatable with the steering shaft about said center axis and including a hub portion secured to said rear end portion,
   a switch support structure having an electric switch assembly supported thereon, the switch support structure being rotatable about an extension of said center axis with respect to each of the steering column tube, the steering shaft and the steering wheel structure,
   first spool means fixed with respect to said switch support structure and having two outer peripheral surface portions which are substantially distinct from each other along the extension of said center axis,
   second spool means fixed with respect to said steering column tube and having two outer peripheral surface portions which are substantially distinct from each other along the extension of said center axis, and
   two flexible lines each anchored at one end thereof to said first spool means and at the other end thereof to said second spool means,
   one of the flexible lines being partially wound in one direction on one of the two outer peripheral surface portions of said first spool means and on one of the two outer peripheral surface portions of said second spool means,
   the other of said flexible lines being partially wound in the other direction on the other of said two outer peripheral surface portions of said first spool means and on the other of said two outer peripheral surface portions of said second spool means.

2. A steering mechanism as set forth in claim 1, in which said first spool means comprises a member substantially coaxially supported by one of the steering shaft and said hub portion of the steering wheel structure and rotatable about the extension of said center axis with respect to the steering column tube, the steering shaft and the steering wheel structure.

3. A steering mechanism as set forth in claim 2, in which said member has at least one annular projection axially intervening between said two outer peripheral surface portions of said first spool means.

4. A steering mechanism as set forth in claim 1, in which said second spool means is integral with a rear end portion of said steering column tube.

5. A steering mechanism as set forth in claim 4, in which said second spool means includes at least one annular projection axially intervening between said two outer peripheral surface portions of said second spool means.

6. A steering mechanism as set forth in claim 1, in which said first spool means comprises a member substantially coaxially supported by one of the steering shaft and said hub portion of the steering wheel structure and rotatable about the extension of said center axis with respect to the steering column tube, the steering shaft and the steering wheel structure, and in which said second spool means is integral with a rear end portion of said steering column tube.

7. A steering mechanism as set forth in claim 6, in which each of said first and second spool means includes at least one annular projection axially intervening between said outer peripheral surface portions of each of said first and second spool means.

8. A steering mechanism as set forth in any one of claims 2 to 7, in which said hub portion of said steering wheel structure is formed with two axial passageways substantially parallel with a portion of said center axis and each open at one end thereof in the neighborhood of said first spool means and at the other end in the neighborhood of said second spool means, said flexible lines being respectively passed each partially through said axial passageways between said first and second spool means.

9. A steering mechanism as set forth in claim 8, in which at least one of said flexible lines is electrically conductive.

10. A steering mechanism as set forth in claim 8, further comprising two flexible guide tubes secured to said hub portion of said steering wheel structure through said axial passageways, respectively, each of said guide tubes having an end portion axially projecting in one direction from said hub portion and terminating in the neighborhood of said first spool means and another end portion projecting in the opposite direction from said hub portion and terminating in the neighborhood of said second spool means.

11. A steering mechanism as set forth in claim 10, in which each of the end portions of each of said guide tubes is tapered toward its free end.

12. A steering mechanism as set forth in claim 10, in which said member is axially movable on said hub portion.

13. A steering mechanism as set forth in claim 12, further comprising a generally cylindrical sleeve bearing secured to said hub portion and having said member slidably received thereon.

14. A steering mechanism as set forth in claim 13, in which said sleeve bearing has an annular projection with which said member is axially engageable when moved forwardly along said center axis.

15. A steering mechanism as set forth in claim 10, in which said switch assembly includes at least one annular contact element fixed with respect to said first spool means, at least one annular contact element fixed with respect to said second spool means, and at least one electrically conductive strip member secured to said hub portion and held in slidable contact at one end thereof with one of said contact elements and at the other end thereof with the other of said contact elements.

16. A steering mechanism as set forth in claim 2, in which said two outer peripheral surface portions of each of said first and second spool means are different in diameter from each other.

* * * * *